No. 811,266. PATENTED JAN. 30, 1906.
A. ANDERSON & W. E. PALMER.
HAY FORK.
APPLICATION FILED AUG. 24, 1904.

2 SHEETS—SHEET 1.

Witnesses

W. E. Palmer, Inventors
A. Anderson

Attorneys

No. 811,266. PATENTED JAN. 30, 1906.
A. ANDERSON & W. E. PALMER.
HAY FORK.
APPLICATION FILED AUG. 24, 1904.

2 SHEETS—SHEET 2.

Witnesses
W. E. Palmer,
A. Anderson
Inventors

Attorneys

UNITED STATES PATENT OFFICE.

ANTON ANDERSON AND WILFORD E. PALMER, OF GRANTSVILLE, UTAH.

HAY-FORK.

No. 811,266.  Specification of Letters Patent.  Patented Jan. 30, 1906.

Application filed August 24, 1904. Serial No. 221,965.

*To all whom it may concern:*

Be it known that we, ANTON ANDERSON and WILFORD E. PALMER, citizens of the United States, residing at Grantsville, in the county of Tooele, State of Utah, have invented certain new and useful Improvements in Hay-Forks; and we do hereby declare the following to be a full, clear, and exact description of the invention, such as will enable others skilled in the art to which it appertains to make and use the same.

This invention has relation to that class of hay-forks that are provided with prongs, a handle, a bail, and a tripping device, with means to control the tripping means in order that it may be caused to discharge its load and be "set" for a new operation.

It is the object of the invention to render hay-forks more efficient and safe in use and adapt them to be operated with greater readiness, so that a greater amount of work can be performed in a given time and, moreover, so that the work may be done easier and more satisfactorily.

To these ends the invention consists in the improvements that we will now proceed to describe, reference being had to the annexed drawings and the symbols of reference marked thereon, forming a part of this specification, the same symbols designating the same parts or features, as the case may be, wherever they occur.

Figure 1:
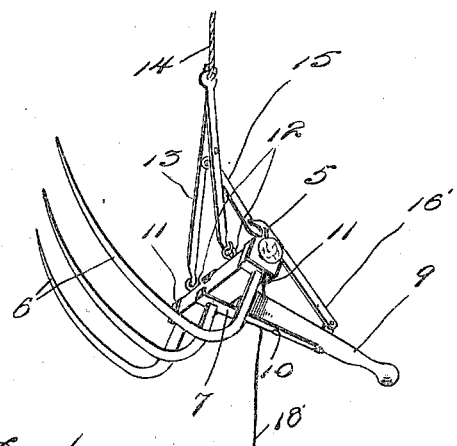
Figure 2:
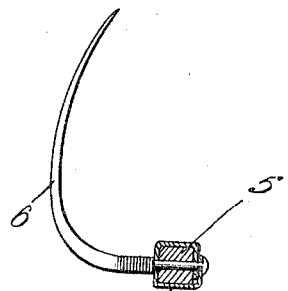
Figure 3:
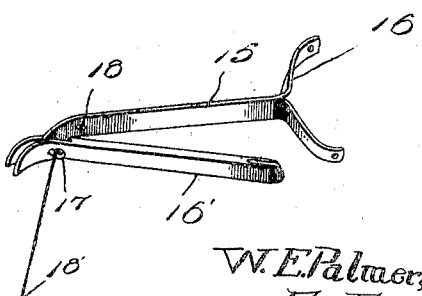
Figure 4:
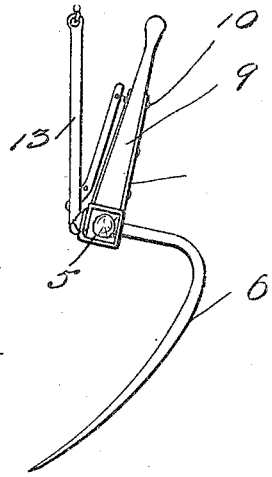
Figure 5:
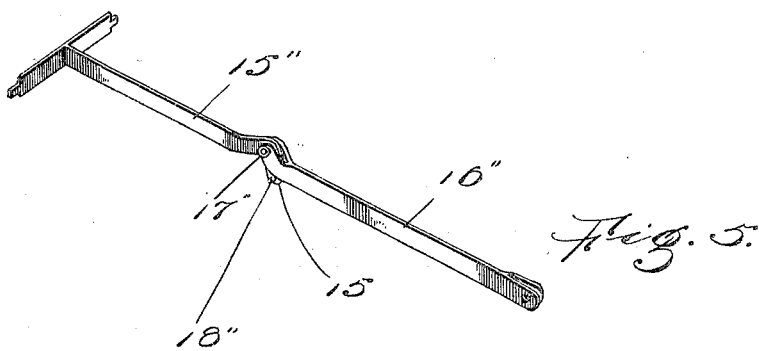
Figure 6:
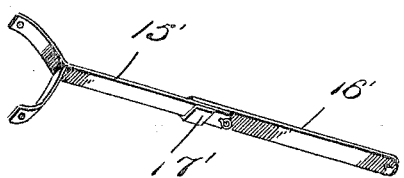

Of the said drawings, Figure 1 is a perspective view of our improved hay-fork. Fig. 2 is a sectional view of the same. Fig. 3 is a perspective view of the knuckle-brace shown in Fig. 1. Fig. 4 is a side elevation showing a fork employing a second form of knuckle-brace, the fork being in dumping position. Fig. 5 is a detail perspective view of the knuckle-brace shown in Fig. 4. Fig. 6 is a detail perspective view of a form of knuckle-brace.

Referring now to the drawings, there is shown a fork comprising a head 5 and tines 6, the latter being engaged through the head, as illustrated. The central tine is engaged through the straps 7 and the head with their free ends extending rearwardly therefrom to receive between them a handle 9, to which said straps are secured by bolts 10. The attached ends of the remaining tines are engaged through bands 11, that are fitted around the head 5, said bands and portions of the head with which they are engaged being angular. With this construction the tines are positively secured, while splitting of the head is prevented.

The head 5 is provided with eyes 12, with which are engaged pivotally the ends of a bail 13, to the bight portion of which is attached the hoisting-cable 14.

In the use of the fork it is manipulated by means of handle to engage its tines in or beneath the load, and the fork is then raised and swung to the proper point and then dumped. To hold the fork in engaging position while carrying the load, a knuckle-brace is employed consisting of the link 15, having a yoke 16 at one end pivoted between the sides of the bail. A second link 16' is pivoted at one end to the handle, and its opposite end is bifurcated to receive the free end of the first-named link, which is pivoted thereto some little distance inwardly from the bifurcated end of the second link.

The end of the link 15 which is pivoted to the link 16 is turned slightly away from the head of the fork, while the adjacent extremity of the link 16, beyond its pivotal connection with the link 15, is turned in the direction of the head, and so projects that when the connected ends of the links are swung away from the head 5 slightly beyond alinement the extremities of the bifurcated link 16 will strike the cross pin or stop 18, carried by the link 15, thus limiting movement of the links and preventing pivotal movement of the bail in the direction of the handle. The pivot 17, that connects the two links, is in the form of an eyebolt, in the eye of which is connected a trip-line 18. When the fork has been raised and swung to the proper position for dumping, the trip-line is pulled, so that the knuckle-joint is folded and the free ends of the tine of the fork swing downwardly, so that the load is permitted to pass therefrom. The trip-line may also be used to pull the fork down to receive its next load.

In Fig. 6 of the drawings there is shown a different form of knuckle-brace, wherein the link 16' is provided with a laterally-directed hook 17', which receives the link 15' when the latter has been swung slightly beyond alinement with the link 16', the hook acting as a stop the same as the pin in the construction above described.

In Fig. 5 of the drawings there is shown a construction wherein the link 15'', corresponding to the link 15, has its end curved upwardly and then downwardly where connected to the link 16'' by the eyebolt 17''.

The eyebolt is engaged, through the link 16″, at its point of highest curvature, and at the extremity of the link 15″ is a transverse stop-pin 18″, corresponding to and for the same purpose as the stops above described.

What is claimed is—

A fork comprising a head, a handle connected to said head, tines engaged through the head, eyes carried by the head, a bail engaged in the said eyes on the head and having an eye formed in its free end for the attachment of a hoisting-cable, a link including arms at one of its ends, said arms having their ends pivotally connected to the opposite inner sides of said bail near the upper end of the latter, the other end of said link being curved laterally, a second link having apertured lugs formed on each of its ends, the curved end of the first-named link being pivoted between the lugs of one of the ends of the last-named link, the other end of said last-named link being pivoted to the said handle, a pin carried by said first-named link and extending from each side thereof to engage the lugs of the last-named link, and a drop-line connection formed on the pivot of the two links.

In testimony whereof we affix our signatures in presence of two witnesses.

ANTON ANDERSON.
WILFORD E. PALMER.

Witnesses:
GEORGE HAMMOND,
W. F. HUDSON.